Patented Feb. 2, 1954

2,668,154

UNITED STATES PATENT OFFICE 2,668,154

PROTEIN ADHESIVES FROM ANIMAL GLUE, A HYDRAZIDE AND FORMALDEHYDE

George Otto Orth, Jr., Seattle, Wash., assignor to Mathieson Chemical Corporation, a corporation of Virginia No Drawing. Application May 26, 1950, Serial No. 164,595

7 Claims. (Cl. 260—6)

My invention relates to the production of modified protein adhesives, particularly modified animal glues, having improved properties with respect to controllable gel strength, adhesive strength and water resistance.

One of the commonest and cheapest adhesives is glue derived from bones by leaching and concentrating. For example, about 168,000,000 pounds of animal glue were produced in 1948, of which about half was low-grade glue derived from bones by leaching and concentrating. The production of both hide and bone glue, of course, depends on the number of animals killed for meat per year. The amount of high grade hide glue available has, as a rule, never been sufficient to meet the demand. The potential yield of low grade glue is 3 to 6 times that now produced, and the sale of the low grade glue is becoming increasingly difficult. This is sharply reflected in the price of bone glue which is little more than half that of hide glue.

Many proposals naturally have been made to upgrade low-grade glue and to improve the properties of glue generally. Bone glue is particularly deficient with respect to gel strength which affects adhesive strength and with respect to gelling time which affects quickness of tack and plant production rates through working life. The utility of most glues is limited in terms of resistance against water, mold and bacterial deterioration. Proposals have been made to modify glues with respect to these properties, but they usually have not gone far enough to materially improve adhesive strength, or have gone so far as to produce irreversible gels incapable of control.

I have discovered that incorporation of small amounts of an organic acid hydrazide and formaldehyde in glue produces a significant improvement in gel or adhesive strength and in water resistance. The improvement is particularly marked with low strength glues, but is valuable in fortifying high grade glues. With high grade glues, the improvement in water resistance is of particular significance. In addition, the mold and bacteria resistance of the modified glues is improved. The improvement is applicable in general to other protein adhesives, for example, casein and zein glues.

I have found that the organic acid hydrazide and the formaldehyde may be separately added to the glue, or the hydrazide and formaldehyde may be first reacted to form a resinous product which upon addition to the glue works a similar improvement in properties. The organic acid hydrazide is a derivative of hydrazine and an organic acid. Although the property of improving gelling characteristics of glue when added with formaldehyde appears to be characteristic of the class of organic acid hydrazides, considerations of glue manufacture limit the useful hydrazides to those forming water-soluble products with formaldehyde. The hydrazide-formaldehyde combination must be compatible with the glue composition, and the glue must retain its solubility in water for ready use. Accordingly, long chain fatty acid hydrazides and aromatic acid hydrazides, unless they contain a solubilizing group such as hydroxy as in hydroxybenzoic acid, are not sufficiently compatible for value. Complex chemical inter-reaction between glue, formaldehyde and hydrazide may explain the valuable activity of the hydrazides in the presence of formaldehyde. Accordingly, acids containing at least two functional or chemically reactive groups are most suitable in the formation of useful hydrazides. The hydrazides of the dibasic organic acids; e. g. adipic, are particularly useful and have special value.

The capacity of the hydrazide and formaldehyde combination for fortifying glue is apparently due to chemical reaction with the glue, for I have determined that the addition of even relatively large amounts of the hydrazide alone merely lowers the viscosity of the glue, apparently due to hydrolysis. Immediately upon addition of formaldehyde, however, a sharp increase in viscosity results, and as more formaldehyde is added, the product sets to a solid gel. When formaldehyde alone is added to glue, formogelatin, an insoluble gel which swells in water and has no adhesive properties, is quickly formed. Normal gelatin will take up from 2 to 4 per cent of formaldehyde, apparently as methylol groups, in an unstable form which is liberated quite readily under drying or dehydrating conditions. I have found, however, that in the presence of the hydrazide several moles of formaldehyde can be added to the glue without formation of formogelatin. For example, with about 5 per cent of a dibasic acid hydrazide such as succinyl, adipyl, or sebacyl in a 40 per cent solution of bone glue as much as about 2.8 moles of formaldehyde or more, depending upon the nature of the glue can be added without formation of an irreversible gel. Even after heating for one hour, the gel is liquid when hot but solid when cool. On the other hand, I found that when formaldehyde is added direct to the glue in the same proportions as when used with the hydrazide, the gelatin formed in all cases became irreversible upon heating. I am not able to account for this phenomenon, but apparently chemical reaction of the hydrazide with the glue is in some way involved, for in the absence of the glue, the reaction of only about 1.6 moles of formaldehyde with 1 mole of the hydrazide tends to produce an insoluble, irreversible gel.

As I have indicated above, either the hydrazide and the formaldehyde may be added separately to the glue, or a resin may be formed by extraneous reaction of the hydrazide and the formaldehyde for incorporation in the glue. The preformed resinous product is particularly convenient to handle and provides excellent control in the modification treatment. The dihydrazides of organic dibasic acids, for example, those of succinic, adipic and sebacic acids are particularly useful. They improve the gelling time of the glue mixture, yet tolerate relatively substantial proportions of formaldehyde, and improve gel and adhesive strength. Other difunctional acids, however, form useful hydrazides, for example, the lower aliphatic acids and unsaturated dibasic acids, including aromatic dibasic acids such as terephthalic acids, for example, provided the hydrazide-formaldehyde resinous product is reasonably water soluble. An unsaturated dibasic acid; maleic acid, is useful.

For modification of the properties of the final adhesive, minor amounts of hydrazides of low water solubility may be incorporated with the dibasic acid hydrazides. The particular advantage of these minor proportions of other hydrazides are increase in working life, water resistance and adhesive strength. For these purposes, various saturated higher fatty acid hydrazides such as stearic and lauric hydrazides may be incorporated in minor amounts. Naphthenic hydrazides derived from the naphthenic acids of petroleum have the advantage of imparting relatively greater oil solubility. Hydrazides of unsaturated fatty acids are useful in plasticizing the compositions, and for this purpose, oleic hydrazide may be used as well as the hydrazides from the fatty acids of corn oil, soy bean oil, linseed oil and other fatty glycerides.

The hydrazides are readily prepared as by reaction of a dibasic acid ester such as succinic, adipic or sebacic with hydrazine. Approximately, stoichiometric proportions are employed and the reaction mixture is warmed. The yields are practically theoretical with virtually no side reactions. Economical, standard line reaction vessels may be employed, and unreacted chemicals may be recycled. In modifying the glue, the hydrazide is advantageously added directly to the liquid stock after extraction. The formaldehyde is then added with stirring and the usual steps of concentration and drying are completed. The formaldehyde component is advantageously used in the form of its 37 per cent solution commonly known as formalin.

The greater the amount of hydrazide that is added, the greater the amount of formaldehyde on the total mix that can be added with resultant increasing degree of gelation and decreasing time of gelation. On the other hand, a relatively small proportion of the hydrazide, e. g. about 2 per cent, appears to be most effective from the standpoint of bond strength and drying time. In addition, the cost of the hydrazide is a practical limiting factor, and I have limited most of my work to compositions containing about 5 weight per cent of the hydrazide on the solids basis or less for that reason. About 1 to 5 per cent permits considerable flexibility in the amount of formaldehyde to be added; e. g., up to about 2.8 to 3.0 moles per mole of hydrazide, but more can be used if desired. The degree of gelation increase thus may be varied by controlling the amount of hydrazide or the amount of formaldehyde added. The relative proportions are desirably determined in advance by simple empirical testing of the gelling time, solidity and reversibility. For example, I found that a bone glue of low gel strength was brought up to a gel of approximately 77 using 5 per cent adipyl hydrazide and 2.6 moles of formaldehyde.

About 1 to 3 moles of formaldehyde per mole of hydrazide is a useful proportion to employ. The higher carbon length acid dihydrazides do not tolerate quite as much formaldehyde as the lower. Thus, sebacyl hydrazide when added in a proportion of about 5% on solids to 40 per cent bone glue solution gelled while heating upon addition of about 2.4 moles of formaldehyde, whereas 2.8 moles with 5 per cent adipyl hydrazide produced a reversible gel. On the other hand as indicated above, sebacyl hydrazide works a greater improvement in water resistance. Lower proportions of the hydrazide permit larger proportions of formaldehyde when referred to hydrazide. For example, 2.3 moles formaldehyde with 5 per cent adipic dihydrazide in a bone glue of 53 grams original test jelly and 38 viscosity resulted in an insoluble product, while 1 per cent adipic dihydrazide took up to 3.45 moles of formaldehyde with no apparent insolubility.

Where the hydrazide-formaldehyde resin is preformed and added to the glue, the technique is similar to the procedure for separate addition of the materials. The resin is cooked in prior to the drying operation. Additional formaldehyde may be added to the cook to bring up the gel strength to the maximum without producing an irreversible gel. The hydrazide formaldehyde resins are prepared by adding the desired quantity of the formaldehyde, as 37 per cent formaldehyde, to the hydrazide in aqueous solution, warming to complete the reaction, pouring while hot, allowing to cool, powdering the gel formed and drying the powdered gel. The gel is ordinarily so stiff that it may be powdered as a gel from 50 per cent solution in water. The powdered gel dries quite rapidly and each particle seems to dry in such a manner that it does not stick to the adjacent particle.

The powdered resin, depending upon the amount of formaldehyde used, is extremely hard and water soluble. The resins are colorless and odorless, and when dry, are about as hard as cured melamine resin. An increasing quantity of formaldehyde and/or carbon chain length decreases the water solubility. The resins may be produced in standard line equipment and require no special equipment or handling. Once the resin has become thoroughly dry, solution may be difficult, which, of course, assists in part in promoting better water resistance. In this event, the resin is finely powdered prior to incorporation in the glue stock.

Glue solutions which have been modified in accordance with my invention may be dried and the resulting flaked material is soluble in hot water and forms a glue of improved gel strength. The solution of the glue is no more difficult than that of the unfortified glue although the modified glues are marked in general by higher viscosities as well as improved water resistance, gel strength and quick tack. An increase in the proportions of hydrazide-formaldehyde shortens the gelling time, thereby increasing the quick tacking property of the glue.

My invention will be further illustrated in the following examples, which, however, are not intended to be limiting with respect to the nature of the materials, the proportions or procedure used. For the purposes of certain of the examples, a low grade, green bone glue of low gel strength was chosen in order to better illustrate the remarkable increase in gel strength, adhesive value and water resistance developed in a low grade glue. In 40 per cent solution, this glue makes only a soft gel and will not show wood failure on Douglas fir. By wood failure, I mean separation of the wood fibres before separation of the adhesive bond.

Example I

A 40 per cent solution of green bone glue was prepared containing 5 per cent, based on the dry glue, of adipyl dihydrazide. To 50-gram portions of this stock solution various proportions of formaldehyde, based on the dihydrazide content, were added, and the mixture heated for 1 hour on a water bath at 160–180° F. The gel times were determined after removing from the water bath. When the proportion of formaldehyde was between 1.0 and 1.8 moles per mole of dihydrazide, the gel time was several hours, and as the proportion was increased from 2.0 to 2.25 moles per mole of dihydrazide, the gel time decreased from 110 minutes to 60 minutes. The gel time was decreased to 5 minutes with about 2.8 moles of formaldehyde per mole of dihydrazide, and in all cases the gel was heat reversible. Larger proportions of formaldehyde with this particular example caused the mixture to gel while heating and these gels were not reversible by heat.

Example II

Fifteen of the samples prepared in Example I, containing varying proportions of formaldehyde with 5 per cent adipyl dihydrazide, were tested for wood bonding using small wood blocks which were coated with the various compositions and clamped overnight. When removed from the clamps, the blocks were pulled apart and the results recorded according to whether separation occurred at the bond or in the wood. The results show that when the compositions of Example I were diluted to 20 per cent total solids (in order to make the differences more easily detectable) wood failure did not occur until about 2.3 moles of aldehyde were used, based on each mol of dihydrazide. The strength of the bonds improved and a greater proportion of wood failure occurred as the proportion of aldehyde was increased to 2.75 moles. In a test of the 40 per cent bone glue solution which had not been treated according to the present invention, but in which test the procedure was otherwise substantially the same, complete separation at the bond occurred on pulling the blocks apart. In another test, a 40 per cent bone glue solution treated with 5 per cent, based on the dry glue of adipyl dihydrazide, and 2.25 moles of formaldehyde, based on the dihydrazide, almost no separation occurred at the bond and the wood failed completely when the blocks were separated.

Example III

In this example 50-gram portions of a 35 per cent solution of the same bone glue were taken and various proportions of succinyl adipyl and sebacyl dihydrazides were added and warmed until the latter dissolved. In all cases, formaldehyde equivalent to 2.5 moles per mol of dihydrazide was added, and the mixture heated for 1 hour at 160–180° F. in a water bath. Using 6, 7, and 8 per cent of succinyl dihydrazide the gel times determined after removing the mixture from the water bath were 45, 40 and 30 minutes respectively. Using adipyl dihydrazide in proportions of 6, 7 and 8 per cent, based on the dry glue, the gel times were 30, 20 and 10 minutes. A gel time of 25 minutes was obtained with a 6 per cent sebacyl dihydrazide composition. All of these compositions gave gels which were reversible by heat. Compositions containing 7 or more per cent of sebacyl dihydrazide gelled while heating under these conditions, and these gels were not heat reversible.

Example IV

Wood samples were glued with the glues of Example III by a procedure similar to that described in Example II. Extensive wood failure occurred in all of the samples prepared.

Example V

The improved water resistance of my modified glue compositions is illustrated by the preparation of 20 per cent solutions of bone and chrome glue containing 5 per cent adipyl dihydrazide and 2.6 moles of formaldehyde in the bone glue composition and 2 moles of formaldehyde, based on the dihydrazide, in the chrome glue composition. These were heated as described in the preceding examples. The chrome glue composition gelled in about 1.5 hours to a firm gel whereas the bone glue as well as both types of glue when untreated, required about 12 hours to gel. Two-inch square blocks of wood were coated with the two compositions as well as the untreated compositions, allowed to dry for 48 hours and then soaked in water for 24 hours. The blocks bonded with the untreated glues fell apart within 3 hours whereas the treated compositions were still bonded after 8 hours. After 12 hours these samples could be pried apart without showing wood failure.

Example VI

To 40 per cent bone glue solutions were added 5 per cent sebacyl dihydrazide and in one case, 2 moles, and in another case, 2.2 moles of formaldehyde per mole of dihydrazide. These two compositions were heated for 1 hour at 160–180° F. and used for gluing wood samples. The wood samples were clamped together for 60 hours and immersed in water for 24 hours. After soaking, the samples were parted and both showed wood failure in addition to bond failure.

Example VII

To 3 batches of 8.7 grams of adipyl dihydrazide dissolved in 10 grams of water were added 5.7 grams, 6.5 grams and 7.3 grams respectively of 37 per cent formalin corresponding to 1.4, 1.6 and 1.8 moles of formaldehyde per mol of hydrazide. The mixtures were heated until gelation occurred which required about 5 minutes. The rubbery gels were ground and dried and used in extending bone glue.

To 25-gram portions of 40 per cent bone glue solution were added 5, 6 and 7 per cent of each of the three adipyl dihydrazide-formaldehyde resins prepared in the preceding paragraph. All nine compositions were heated 1.25 hours in a water bath at 170–180° F. All gelled in about 45 minutes after removal from the water bath and all were heat reversible. Wood samples prepared using these glues as described in the above examples all gave wood failure in addition to bond failure. The resins containing 1.6 and 1.8 moles of formaldehyde gave a stronger glue than the resin with 1.4 moles of formaldehyde.

Example VIII

Methyl butyrate was prepared as follows:
88 gms. butyric acid (1 mol)
150 gms. methyl alcohol (4.7 moles)
50 gms. calcium chloride Dry hydrochloric acid gas was bubbled through the refluxing mixture of above ingredients for 5 hours. The ester was separated, washed with dilute sodium carbonate and water and dried over calcium chloride. Upon distillation, 74 grams were obtained at 98–103° C. The yield was 72.5 per cent of theory.

25 grams hydrazine were added to the ester. 20 grams butyl alcohol were then added, putting most of the hydrazine in solution. Complete solution was obtained after 15 minutes of refluxing. The heating was continued for 4 hours. The contents were then vacuum distilled, leaving butyryl hydrazide as the residue, which crystallized upon cooling. The melting point was 44° C. Yield was 66 grams or 89.2 per cent of theory from the ester and 64.7 per cent overall yield from the acid.

Butyryl hydrazide was also prepared via butyl butyrate. Butyl butyrate was prepared as follows: Dry hydrochloric acid gas was bubbled through a refluxing mixture of 88 grams butyric acid, 300 grams n-butyl alcohol and 50 grams calcium chloride for 5 hours. The bottom layer of calcium chloride and water was separated and 204 grams butyl alcohol were distilled off up to a temperature of 127° C. The residue was washed with water and with dilute sodium carbonate, dried over calcium chloride, and fractionally distilled. Butyl alcohol coming over first was discarded. 69 grams of butyl butyrate were collected at 162–165° C. The yield was 48 per cent.

Butyryl hydrazide was obtained in 70 per cent yield from the ester. A mixture of 36.1 grams butyl butyrate, 8.7 grams 93 per cent hydrazine, and 10 grams butyl alcohol were brought to solution after 15 minutes of refluxing. Heating was continued for 4 hours. Butyl alcohol and any unreacted ester and hydrazine were vacuum distilled off up to the temperature at which butyryl hydrazide began to distill, being 130° C. at 30 mm. of Hg pressure. The residue of butyryl hydrazide crystallized to white needles upon cooling. 18 grams were obtained, melting at 44° C.

Four batches of glued block samples were prepared from 40 per cent solutions of bone glue containing 3, 4, 5 and 7 per cent butyryl hydrazide, based on the glue, with 0.4, 0.5, 0.6, 0.7, 0.8, 0.9 and 1.0 mol formaldehyde per mol of hydrazide. All the samples were cooked 15 minutes on a water bath, and 2 x 2 vertical-grain Douglas fir blocks were glued with the hot glue solution. All the block samples were clamped for 24 hours, then failed in the block shear press. There was no marked increase in the pressures required to shear the blocks with increasing formaldehyde ratio. All the samples, including the blank, gave poor wood failure; but there was a trend towards significant improvement with butyryl hydrazide and formaldehyde.

Example IX

A mixture of 10.5 grams 93 per cent hydrazine and 13.0 grams water added to 23.4 grams trimethyl citrate formed a yellow solution with evolution of heat. The resulting solution was refluxed 1½ hours. The solution became turbid and it cooled to a viscous, syrupy liquid. There was no change in appearance after leaving over night in the refrigerator.

A series of glued block samples were prepared using 5 per cent citric trihydrazide and 1.0, 2.0, 3.0, 4.0, 5.0, 6.0 and 7.0 moles formaldehyde in 30 per cent solutions of bone glue. Citric trihydrazide was added as the 50 per cent solution. The glue solutions were cooked 15 minutes on a water bath and 2 x 2 blocks of vertical grain Douglas fir were glued with the hot glue solution. The blocks were clamped for 24 hours and then failed in the block shear press. There was a slight increase in the block shear pressures and in wood failures with increasing formaldehyde ratio up to 5 moles, decreasing slightly for the 6 moles, and markedly for the 7 moles formaldehyde samples. All the samples gave slightly greater wood failures and block shear pressures than the blank. All the glues were heat reversible, except the 7 moles formaldehyde sample.

Example X

To 100-gram portions of 20 per cent bone glue solution, were added 5 per cent thiocarbohydrazide (thiocarbazide) and 1.4 to 3.0 moles of formaldehyde per mole of thiocarbohydrazide. All were cooked 20 minutes on a water bath, and 2 x 2 vertical grain Douglas fir blocks were glued with the hot glue solution and left clamped for 65 hours. The glued block samples were then failed in the block shear press. Samples containing thiocarbohydrazide and formaldehyde all gave greater shear strength and wood failure than the samples of straight 20 per cent bone glue. The higher ratios of formaldehyde gave the best results.

Example XI

The following results were obtained by treating an average grade of bone glue with adipic dihydrazide:

| Percent ADH/dry glue | Molar Ratio HCHO/ADH | Jelly (Grams) | Viscosity (M. P.) |
|---|---|---|---|
| Untreated glue | [1] (Blank) | [2] 102 (104) | [2] 44 (46) |
| 5 | 1.7 | 95 | 44 |
| 5 | 2.1 | [2] 100 (116) | [2] 56 (66) |
| 5 | 2.5 | Insoluble | |

[1] In all cases "Untreated glues" refer to the original glue which has been put through the same heating and stirring as the treated glues.
[2] Check determinations.

In a second series, 2 per cent adipic dihydrazide in different glues was used:

| Percent ADH/dry glue | Molar Ratio HCHO/ADH | Jelly (Grams) | Viscosity (M. P.) | Concentration Water/Glue | Shear Break 1# sq. in. | Percent Wood Failure |
|---|---|---|---|---|---|---|
| Untreated glue | (Blank) | 53 | 34 | 1¼:1 | 800 | 25–30 |
| 2 | 2.1 | 58 | 38 | 1½:1 | 900 | 65–70 |
| 2 | 2.3 | 62 | 41 | | | |
| 2 | 2.5 | 63 | 44 | 2:1 | 2,375 | 100 |
| 2 | 2.7 | 64 | 50 | 2½:1 | 1,060 | 85–90 |
| 2 | 3.0 | 77 | (¹) | (¹) | (¹) | (¹) |

¹ Partly insoluble.

In general, the glue-hydrazide-formaldehyde solutions in the above examples were prepared at 160° to 190° F. The resulting solutions were poured into pans and allowed to jelly, forming handable sheets about ¼-inch in thickness. The latter were dried in the usual manner on a 1-inch mesh wire netting in an air tunnel. After the sheets had dried to a normal moisture content of approximately 12 per cent, they were ground and individually weighed up for testing.

Viscosity is determined by dissolving 15 grams of air dried glue in 105 grams of water. The solution is heated to 60° C. and absolute viscosity determined in millipoises. Gel or jelly strength is tested by placing the solution from viscosity testing in a water bath at 10°±1.0° C. for a period of 16–18 hours. The jelly gram test is then determined by a gelometer. For moisture test, 10 grams of the air dried glue is weighed into a moisture dish and placed in an oven at 250° F. for a period of 16–18 hours. It is then cooled in a desiccator, reweighed and moisture loss calculated. Bond or adhesive strength is determined by the standard AN-G-8 Block Shear Strength Test of the Forest Products Laboratory, Madison, Wisconsin. The dry glue is soaked in a predetermined amount of water which will eventually give a hot glue solution having a consistency similar to that of paint. Usually 1¼ to 1½ parts water to 1 part glue is sufficient, but too little should be avoided because the mixture tends to become insoluble and not redissolvable when exposed to heat; e. g. 140° F. or above. The details are as follows: The solutions are prepared by weighing out the correct amount of ground air-dried glue and adding it to the proper amount of cold water. The mixture is permitted to soak for an hour or so, depending upon the fineness of the grind, then placed in a water bath and melted down at 140° F. At this temperature, 1-inch wooden blocks (poplar) are coated on each of the contact surfaces with the glue solution. The application should not be heavier than an ordinary coat of house paint. After applying the coating to the wood, the surfaces should not be placed together until the glue film just starts to thicken or lose its free flowing property, otherwise the subsequent pressure in the press will squeeze most of the glue from the joint and a poor bond will result. Soon after the joint has been assembled or closed, it is subjected to a pressure of 50–100 pounds per square inch and allowed to remain undisturbed for a period of 24–48 hours, after which they are ready to be removed from the press and broken. Block joints are usually broken by driving a blunt-nosed chisel down the glue line. It is advisable to make a shallow cut with a saw directly into the glue line before inserting the chisel in order that the latter gets started in the proper place. After the bonds are broken, the percentage of wood failure or wood tear is estimated by observing the amount of exposed glue line which contains no wood pulled from its opposite gluing surface.

I claim:

1. A modified glue composition which consists essentially of the product obtained by heating an aqueous mixture of a major proportion of animal glue and of minor proportions of formaldehyde and of an organic carboxylic acid hydrazide capable of forming a water-soluble product with formaldehyde, said mixture having been heated for a period of time sufficient to convert the mixture to a gel.

2. The composition of claim 1 where the proportion of the hydrazide is about 1 to 5 weight per cent on a solids basis and the formaldehyde component is present in a proportion approximating 1 to 3 moles per mole of hydrazide.

3. The composition of claim 1 where the hydrazide is an aliphatic dibasic acid dihydrazide.

4. The composition of claim 3 where the dihydrazide is adipic hydrazide.

5. The composition of claim 3 where the dihydrazide is succinic hydrazide.

6. The composition of claim 3 where the dihydrazide is sebacic hydrazide.

7. A modified glue composition which consists essentially of the product obtained by heating an aqueous mixture of a major proportion of animal glue and of minor proportions of formaldehyde and of a hydrazide capable of forming a water-soluble product with formaldehyde, said hydrazide being selected from the group consisting of organic carboxylic acid hydrazides and thiocarbohydrazide, and said mixture having been heated for a period of time sufficient to convert the mixture to a gel.

GEORGE OTTO ORTH, Jr.

References Cited in the file of this patent

UNITED STATES PATENTS

| Number | Name | Date |
|---|---|---|
| 2,210,442 | Balle | Aug. 6, 1940 |

OTHER REFERENCES

Delmonte: The Technology of Adhesives, Reinhold 1947, pp. 303 to 307.

Karrer: Organic Chemistry, 2nd English edition, 1946, page 209.